United States Patent [19]

Ooba

[11] 4,141,638
[45] Feb. 27, 1979

[54] FOCAL PLANE SHUTTER
[75] Inventor: Osamu Ooba, Abiko, Japan
[73] Assignee: Copal Company Limited, Tokyo, Japan
[21] Appl. No.: 848,528
[22] Filed: Nov. 3, 1977
[30] Foreign Application Priority Data
Nov. 11, 1976 [JP] Japan .................. 51/135594
[51] Int. Cl.² .............................................. G03B 9/40
[52] U.S. Cl. .................................................. 354/246
[58] Field of Search .............................. 354/245–249, 354/250, 252, 261
[56] References Cited
U.S. PATENT DOCUMENTS
3,864,713  2/1975  Kitai et al. .......................... 354/246
3,871,012  3/1975  Haraguchi .......................... 354/246
4,063,262  12/1977  Inoue ................................... 354/246

Primary Examiner—John Gonzales
Attorney, Agent, or Firm—Cushman, Darby & Cushman

[57] ABSTRACT

A focal plane shutter comprising a pair of upper arms rotatably supported on a shutter base plate, a pair of lower arms provided as opposed to the respective upper arms so as to be rotatable concentrically respectively with the pair of upper arms and a plurality of shutter blades of which some are supported by the upper arms and the remainder are supported by the lower arms between the respective pairs of upper arms and lower arms, whereby the dimensions in the horizontal direction and vertical direction of the entire shutter device can be made smaller.

3 Claims, 4 Drawing Figures

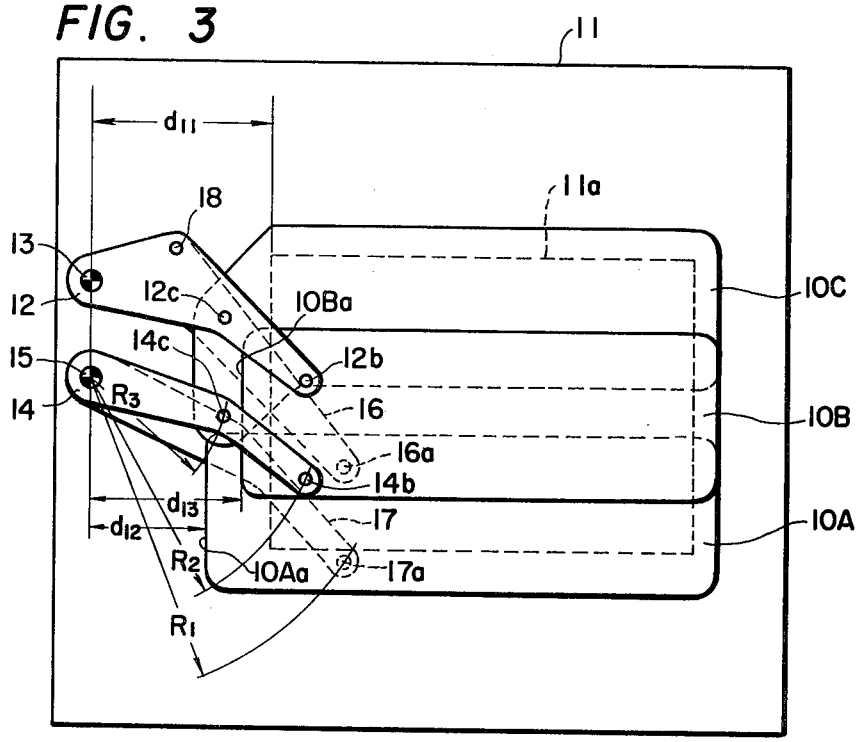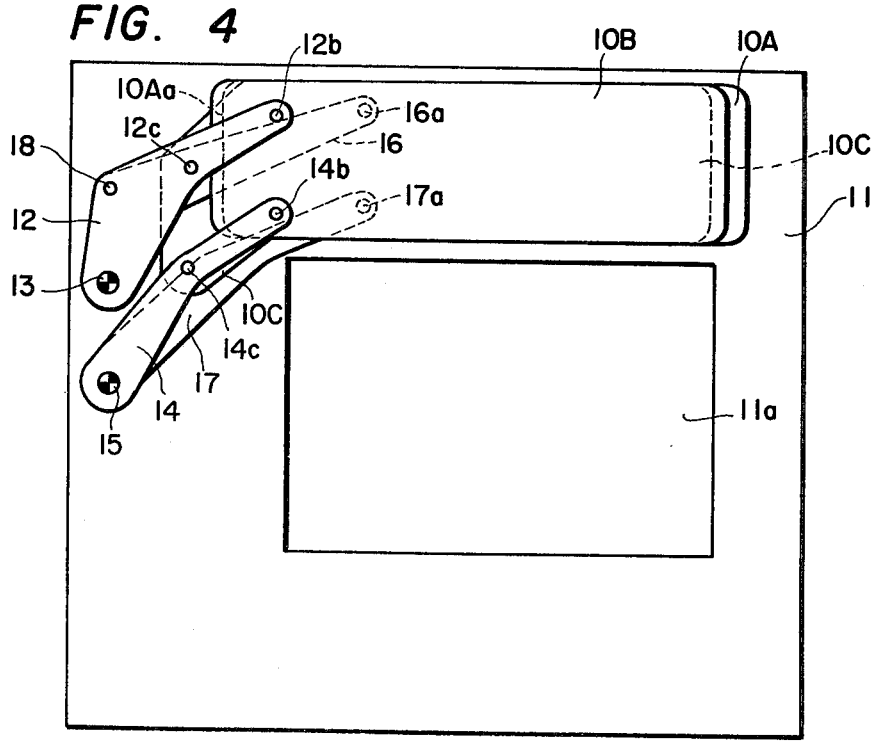

FOCAL PLANE SHUTTER

BACKGROUND OF THE INVENTION (a) Field of the Invention:

This invention relates to a focal plane shutter wherein a plurality of opaque substantially square thin shutter blades are supported by a pair of arms to make an exposure by running them just before a film.

(b) Description of the Prior Art:

In this type of focal plane shutter, the fulcra of the pair of arms are provided on the side of an exposure aperture and the shutter blades are run in the vertical direction just before the aperture. Such various focal plane shutters are already suggested and practiced. The methods of supporting the shutter blades with the arms can be divided into the following two types. The first type is a long arm type. In this type, for example, as disclosed in U.S. Pat. No. 3,871,012, shutter blades are supported by arms on the other side over an exposure aperture than the side on which the fulcra of the arms are provided. Therefore, the arms are longer than the lateral width of the aperture. Then, as the rotating angle of the arm is comparatively small, the displacement in the lateral direction of the shutter blade is also small but, on the other hand, there has been a defect that, if the number of the shutter blades supported by a pair of arms is to be made more than two, the structure will be complicated. Therefore, in order to eliminate this defect, a short arm type has been developed as the second type. In this type, as described later, contrary to the above mentioned long arm type, shutter blades are to be supported on the same side of the aperture, that is, in the positions near the fulcura of the arms and many shutter blades can be very simply supported by a pair of arms but, on the other hand, there has been a defect that the size in the lateral direction is large.

It shall be described in detail in the following with reference to FIGS. 1 and 2. In the drawings, only one set of two sets of blade groups is shown but the other set is substantially identical except that it is arranged symmetrically with respect to the aperture and shall be therefore omitted. In FIGS. 1 and 2, reference numeral 1 indicates a base plate provided with an exposure aperture 1a, numeral 2 indicates a main arm pivoted on the base plate 1 on one side of the aperture 1a by a shaft 3, numeral 4 indicates an auxiliary upper arm pivoted on the base plate 1 on one side of the aperture 1a by a shaft 5. Symbols A, B and C indicate respectively shutter blades supported on the main arm 2 and auxiliary arm 4 respectively by shafts 2a and 4a; 2b and 4b, 2c and 4c. Further, in FIG. 1, symbol $d_1$ indicates a distance between the shafts 3, 5 and the left edge of the exposure aperture 1a, symbol $d_2$ indicates a distance between the shaft 5 and the left end edge Aa of the shutter blade A and symbols $R_1$, $R_2$ and $R_3$ indicate respectively distances from the shaft 5 to the shafts 4a, 4b and 4c. By the way, FIG. 1 shows the blade group as unfolded and FIG. 2 shows the blade group as folded. In assembling them, the shutter blade A is first fitted to the main arm 2 and auxiliary arm 4 and then, below it, the shutter blades B and C are fitted onto the arms 2 and 4 so as to be overlapped in turn. In such case, the overlapping order can not be changed. In the conventional short arm type focal plane shutter by such arrangement as in the above, the respective distances from the shaft 5 to the shafts 4c, 4b and 4a are naturally determined by the width in the vertical direction of the aperture 1a, that is, by the moving ranges in the vertical direction of the shutter blades A, B and C. That is to say, the distance $R_2$ between the shafts 5 and 4b must be set properly by considering the distance $d_2$ from the shaft 5 to the left end edge Aa of the shutter blade A when such blade group as is shown in FIG. 1 is unfolded, the distance $d_2'$ from the shaft 5 to the left end edge Aa of the shutter blade A when such shutter blade group as is shown in FIG. 2 is folded, the thickness of the shaft 4b and the overlapped area of the left end part of the shutter blade A and the base plate 1. Thus, according to the conventional short arm type focal plane shutter, the distance $d_1$ from the position of the supporting shaft of the arm to the left edge of the aperture 1a is regulated by the position of the supporting shaft 4b of the shutter blade B, that is, the other shutter blade arranged adjacently to the shutter blade A for forming an exposure slit and therefore can not be made small. Therefore, not only there is a fixed limitation to reducing the dimension in the lateral direction of the focal plane shutter but also, if the number of the shutter blades becomes larger, the distance $R_2$ will also become longer in response to it, therefore the distance $d_1$ also can not help being made larger and the dimension in the lateral direction of the shutter has had to become larger. In this kind of focal plane shutter, it can be very easy to increase the number of shutter blades of one set of a blade group, thereby the width of one shutter blade can be made that much smaller and the occupied area when the blade group is folded as shown in FIG. 2 may be so small that the dimension of the height of the shutter can be made small. However, there has been a defect that, when the dimension of the height of the shutter is made small, the dimension in the lateral direction will become large.

SUMMARY OF THE INVENTION

Therefore, an object of the present invention is to provide a short arm type focal plane shutter wherein not only the dimension of the entire height but also the dimension in the lateral direction can be made small and even more than three shutter blades can be very easily supported.

According to the present invention, this object is attained by forming a main supporting member and auxiliary supporting member to support a plurality of shutter blades of respectively concentrically rotatable upper arms and lower arms and respectively pivotally supporting some of the plurality of shutter blades with the upper arms and the remainder of them with the lower arms between the upper arms and lower arms.

These two pairs of upper arms and lower arms may be all integrally connected with each other or only either one pair of them may be integrally connected with each other.

This and other objects of the present invention will become more apparent during the course of the following detailed description and appended claims.

BRIEF DESCRIPTION OF THE DRAWINGS

FIG. 3 is an elevational view of a focal plane shutter according to the present invention in the same state as in FIG. 1; and FIG. 4 is an elevational view of the focal plane shutter according to the present invention shown in FIG. 3 in the same state as in FIG. 2.

DESCRIPTION OF THE PREFERRED EMBODIMENT

Figure 1:
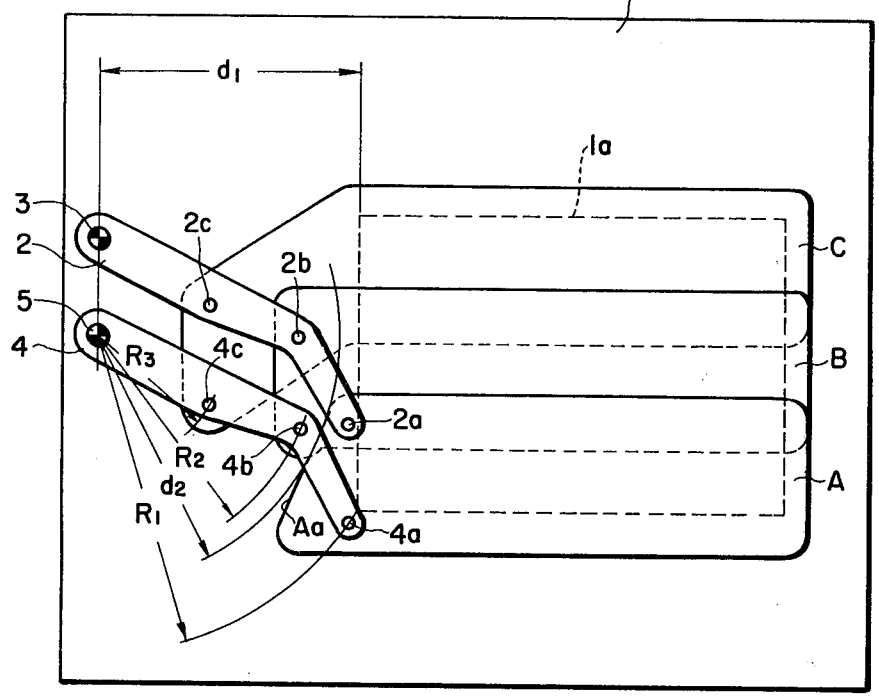
FIG. 1 is an elevational view showing an example of a conventional focal plane shutter in case a set of a shutter blade group is unfolded to cover an exposure aperture.
Figure 2:
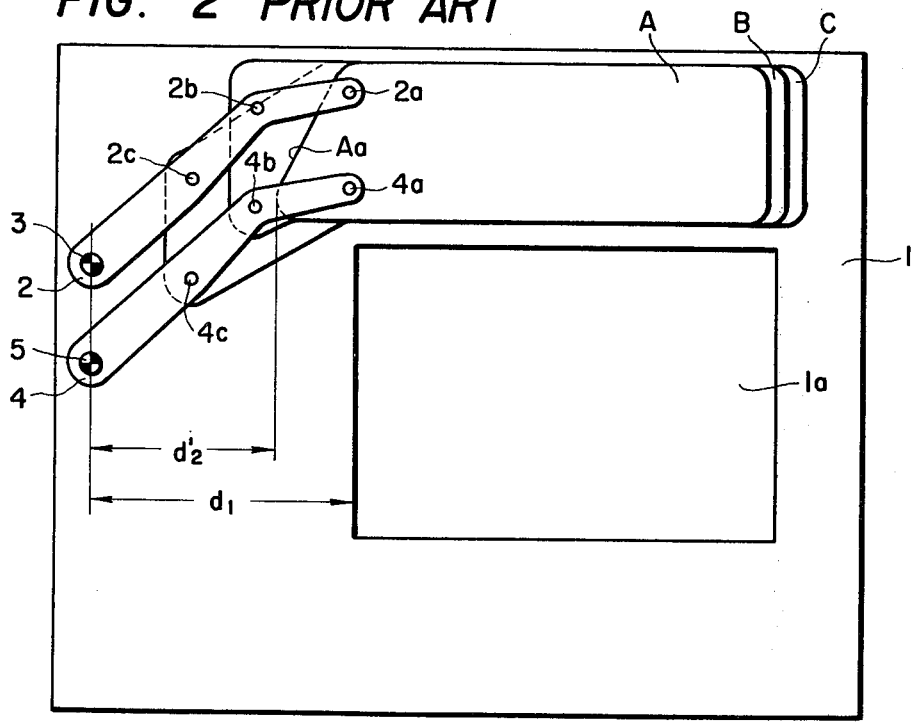
FIG. 2 is an elevational view of the shutter blade group shown in FIG. 1 as folded to open the exposure aperture.

A focal plane shutter according to the present invention shall be explained in the following with FIGS. 3 and 4 with reference to FIGS. 1 and 2 and the explanation already described in relation to them. A main upper arm 12 pivoted onto a base plate 11 by a shaft 13 is connected integrally movably through a pin 18 with a main lower arm 16 pivoted to the shaft 13 and arranged below the arm 12 as opposed to it. An auxiliary lower arm 17 is pivoted by a shaft 15 below an auxiliary upper arm 14 concentrically with it. In such case, the auxiliary lower arm 17 may be or need not be integrally connected with the auxiliary upper arm 14. The main upper arm 12 and auxiliary upper arm 14 respectively pivotally support shutter blades 10B and 10C with shafts 12b and 14b; 12c and 14c and the main lower arm 16 and auxiliary lower arm 17 pivotally support a shutter blade 10A for forming an exposure slit with shafts 16a and 17a. The shutter blades 10A, 10B and 10C are arranged respectively between the main upper arm 12 and auxiliary upper arm 14 and the main lower arm 16 and auxiliary lower arm 17. In assembling them, the shutter blade 10B is first fitted to the main upper arm 12 and auxiliary upper arm 14, then the shutter blade 10C is fitted and at last the shutter blade 10A is fitted. Therefore, as a result, the shutter blades 10B, 10C and 10A are overlapped in turn below.

As in the above, only the shutter blade 10A for forming an exposure slit is supported by the main lower arm 16 and auxiliary lower arm 17. Therefore, the left end edge 10Aa can operate without touching the shafts for supporting the other shutter blades 10B and 10C and thus the distance $d_{12}$ between the shafts 13, 14 for pivotally supporting the respective arms on the base plate 11 and the left end edge 10Aa can be made properly short without being particularly limited. Therefore, the distance $d_{11}$ between the shafts 13, 14 and the left edge of the exposure aperture 11a can be determined by the distance $d_{13}$ between the left end edge 10Ba of the shutter blade 10B and the line segment connecting the shafts 13 and 14 determined by considering the distance $R_3$ between the shafts 15 and 14c without considering the distance $d_{12}$. Needless to say, the distance $R_3$ is shorter than the distance $R_2$ between the shafts 14 and 14b. Therefore, in comparing the distance $d_2$ to be determined by the distance $R_2$ in FIG. 1 with the distance $d_{13}$ in FIG. 3, it is found that the distance $d_{13}$ can be made to be of a very small value. As a result, the distance $d_{11}$ can be set to be of a value much smaller than of the distance $d_1$ in FIG. 1. Nevertheless, the distances $R_1$, $R_2$ and $R_3$ can be made the same as in FIG. 1. In the above mentioned case, even if the auxiliary lower arm 17 is not connected integrally with the auxiliary upper arm 14, as the main upper arm 12 and main lower arm 16 are connected integrally with each other, as a result, the arms 14 and 17 will be able to integrally operate. However, it is quite all right to integrally connect both of these arms 14 and 17 with each other. As obvious from this explanation, in case the auxiliary upper arm 14 and auxiliary lower arm 17 are connected integrally with each other, the main upper arm 12 and main lower arm 16 may be made free from each other.

In such blade assembly according to the present invention as is explained above, in fact, two sets as of a front blade group and rear blade group are used. However, in some case, the blade assembly according to the present invention may be used for either of the front blade group and rear blade group and a blade assembly of a type different from it may be used for the other.

Further, in the above explanation, the blade assembly includes three substantially rectangular thin plates. However, four or more similar thin plates can be also used. In such case, some thin plates can be supported by the arms 12 and 14 and the rest thin plates can be supported by the arms 16 and 17.

As described above, according to the present invention, not only a plurality of shutter blades arranged as overlaped with each other can be prevented from interfering with each other but also the pivotally supporting shaft of each arm and the exposure aperture can be made to approach each other. As a result, in a short arm type focal plane shutter wherein the dimension in the height direction can be made small, further the dimension in the lateral direction can be also made small. Thus the effect of contributing to compact the camera is large.

I claim:

1. A focal plane shutter comprising a base plate having an exposure aperture formed thereon, a pair of shafts secured at a spacing on said base plate on one side of said exposure aperture, a main upper arm and main lower arm each rotatably supported in one end part by one of said pair of shafts and extending in the other end part to the vicinity of the side edge near said shaft of said exposure aperture, an auxiliary upper arm and auxiliary lower arm each rotatably supported in one end part by the other of said pair of shafts and extending in the other end part to the vicinity of the side edge near said shaft of said exposure aperture, and a plurality of substantially rectangular shutter blades of which some are pivotally supported by said main upper arm and auxiliary upper arm in the end edge part near said shaft and the remainder are pivotally supported by said main lower arm and auxiliary lower arm in the end edge part near said shaft between said main upper arm and auxiliary upper arm and said main lower arm and auxiliary lower arm.

2. A focal plane shutter according to claim 1 wherein said main upper arm and auxiliary upper arm and said main lower arm and auxiliary lower arm are respectively integrally connected with each other.

3. A focal plane shutter according to claim 1 wherein either pair of said main upper arm and auxiliary upper arm and said main lower arm and auxiliary lower arm are integrally connected with each other.

* * * * *